(12) United States Patent
Zwarich et al.

(10) Patent No.: US 12,271,718 B2
(45) Date of Patent: Apr. 8, 2025

(54) SYSTEMS AND METHODS FOR PERFORMING BINARY TRANSLATION

(71) Applicant: Apple Inc., Cupertino, CA (US)

(72) Inventors: Cameron Zwarich, Cupertino, CA (US); Denis Palmans, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/343,484

(22) Filed: Jun. 9, 2021

(65) Prior Publication Data

US 2021/0397425 A1  Dec. 23, 2021

Related U.S. Application Data

(60) Provisional application No. 63/042,228, filed on Jun. 22, 2020.

(51) Int. Cl.
*G06F 8/52* (2018.01)
*G06F 9/455* (2018.01)
(Continued)

(52) U.S. Cl.
CPC ............ *G06F 8/52* (2013.01); *G06F 9/45516* (2013.01); *G06F 12/1009* (2013.01); *H04L 9/0643* (2013.01)

(58) Field of Classification Search
CPC .... G06F 8/52; G06F 9/45516; G06F 12/1009; H04L 9/0643
See application file for complete search history.

(56) References Cited

U.S. PATENT DOCUMENTS

| 5,930,509 A | 6/1999 | Yates et al. |
| 6,014,513 A | 1/2000 | Voelker et al. |

(Continued)

FOREIGN PATENT DOCUMENTS

| JP | 2002-132364 A | 5/2002 |
| JP | 2003-140909 A | 5/2003 |

(Continued)

OTHER PUBLICATIONS

Sites et al., "Binary Translation," Communications of the ACM/Feb. 1993/vol. 36, No. 2, 13 pages.
(Continued)

*Primary Examiner* — Wei Y Zhen
*Assistant Examiner* — Amir Soltanzadeh
(74) *Attorney, Agent, or Firm* — Kowert, Hood, Munyon, Rankin & Goetzel, P.C.

(57) ABSTRACT

Systems and methods for performing binary translation include a system that is capable of translating binaries written for use in a source execution environment to binaries compatible with a target execution environment. Consistent with some embodiments, a binary translation system includes a system service and a runtime code module that exists in an application memory address space. The binary translation system translates object-level binaries corresponding to executables, linkers, libraries, and the like and stores the translation in a translation cache that is cryptographically secured to ensure that only a system having a specific key is able to access the translations. If the application or application binary has been modified since the translation was performed, the system service will ensure that the translation is removed from the cache, a new translation is performed, and all threads accessing that translation are updated to the new translation.

22 Claims, 8 Drawing Sheets

(51) Int. Cl.
  *G06F 12/1009* (2016.01)
  *H04L 9/06* (2006.01)

(56) References Cited

U.S. PATENT DOCUMENTS

| | | | |
|---|---|---|---|
| 6,631,514 B1 | 10/2003 | Le | |
| 8,327,354 B1 | 12/2012 | Magenheimer et al. | |
| 8,621,443 B2 | 12/2013 | Miura | |
| 9,201,635 B2 | 12/2015 | Jennings et al. | |
| 9,448,788 B1* | 9/2016 | Barua | G06F 8/52 |
| 9,542,191 B2 | 1/2017 | Caprioli et al. | |
| 2002/0046305 A1 | 4/2002 | Babaian et al. | |
| 2002/0059268 A1 | 5/2002 | Babaian et al. | |
| 2004/0133884 A1 | 7/2004 | Zemach et al. | |
| 2007/0067573 A1 | 3/2007 | Bruenung et al. | |
| 2008/0172657 A1 | 7/2008 | Bensal et al. | |
| 2016/0357528 A1* | 12/2016 | Kanhere | G06F 9/3887 |
| 2016/0378446 A1* | 12/2016 | Ince | G06F 8/33 717/136 |
| 2018/0088921 A1* | 3/2018 | Caprioli | G06F 8/52 |
| 2018/0204025 A1 | 7/2018 | Chhabra et al. | |
| 2019/0129721 A1* | 5/2019 | Plotnikov | G06F 9/30145 |
| 2019/0243966 A1* | 8/2019 | Wei | G06F 12/1009 |
| 2019/0347125 A1 | 11/2019 | Sankaran et al. | |
| 2020/0272577 A1* | 8/2020 | Zeng | G06F 12/1018 |
| 2021/0200541 A1* | 7/2021 | Zhang | G06F 9/3016 |

FOREIGN PATENT DOCUMENTS

| | | |
|---|---|---|
| JP | 2015-179318 A | 10/2015 |
| JP | 2016-054483 A | 4/2016 |

OTHER PUBLICATIONS

Altman et al., IBM Research Report, BOA: The Architecture of a Binary Translation Processor, IBM Research Division Almaden—Austin—Beijing—Haifa—T. J. Watson—Tokyo—Zurich, https://www.researchgate.net/publication/242609331, RC 21665 (97500) Dec. 16, 2000, 36 pages.

The 68LC040 Emulator (IM: PS), Apple Inc., Jul. 3, 1996, https://developer.apple.com/library/archive/documentation/mac/PPCSoftware/PPCSoftware-13.html, 6 pages, printed from Internet Jan. 15, 2021.

ISRWO, PCT/US2021/036751, mailed Sep. 24, 2021, 19 pages.

Bor-Yeh SHen et al, :"An LLVM-based hybrid binary translation system", Industrail Embedded Systems (SIES), 2012 7th IEEE International Symposium on, IEEE, Jun. 20, 2012 (Jun. 20, 2012), pp. 229-236, XP032270908, DOI: 10.1109/SIES.2012.6356589 ISBN:978-1-4673-2685-8 p. 229-p. 236.

Office Action in European Patent Application No. 21736906.5 mailed Nov. 2, 2023, 7 pages.

Office Action in Japanese Patent Application No. 2022-577759 mailed Jan. 5, 2024, 3 pages.

* cited by examiner

SYSTEMS AND METHODS FOR PERFORMING BINARY TRANSLATION

This application claims benefit of priority to U.S. Provisional Patent Application Ser. No. 63/042,228, filed on Jun. 22, 2020. The above application is incorporated by reference in its entirety. To the extent that the incorporated material conflicts with the material expressly set forth herein, the material expressly set forth herein controls.

BACKGROUND

Technical Field

Embodiments described herein are related to binary translation. In particular, embodiments described herein are related to caching translated binaries in a translation cache for rapid retrieval by a system service that manages the cached translations.

Description of the Related Art

The standard way that developers enable an application written for a first execution environment to be executed a second execution environment is to port the application over to the second execution environment, which involves rebuilding and recompiling the application for the second execution environment. The port can take extensive time and effort for a large application and may involve good working knowledge of the second execution environment and the correct tools to recompile for that execution environment. To bridge the gap while an application is rebuilt and recompiled, developers have often used emulators (e.g., interpreters and/or translators) to run the code on a different execution environment. Interpreters typically read the application instructions iteratively in the first, or source, execution environment and perform the operations in the source execution environment running in a software environment within the second, or target, execution environment. Other emulators operate in a similar fashion but will utilize portions of the underlying hardware of the second environment to optimize the interpretation. For example, an emulator may use underlying memory and the underlying processor and system such that the application can appear to be running natively in the second environment, where the application is running at a speed that determined by the power of the underlying hardware and the performance of the interpreter. Binary translators translate various instructions and code of the application from the first execution environment to the second execution environment.

Binary translators may typically be either static or dynamic. A static binary translator attempts to convert all of the application code from the first execution environment to the second execution environment without actually executing the code beforehand. Dynamic binary translation translates discrete blocks of code during execution and caches the translated block for use during the execution of the application containing that code. The Rosetta dynamic translation layer that was used to translate PowerPC applications to x86 is an example of a dynamic binary translator. While dynamic binary translators may be more accurate in that it can account for all of the code that needs translation, it often results in greater hardware overhead during the execution of the application due to the dynamic translation which can cause the application to execute slowly with lag noticeable to a user. Further, if the application that is being translated includes just-in-time (JIT) compilations that require translation, this will further include user-noticeable delays in the application as it is undergoing dynamic binary translation.

SUMMARY

In an embodiment, a system may comprise a memory storing an operating system and one or more application binaries. The one or more application binaries may be written for execution in a first execution environment. The system may further comprise one or more processors configured to execute application binaries in a second execution environment different than the first execution environment. The system may also comprise a binary translator that comprises a system service executable in a separate address space from the application binaries, and a runtime code module executable in an address space with the application binaries. The system service may be configured to manage translations of the application binaries, and the runtime code module may be configured to manage just-in-time (JIT) translations of the application binaries for which the system service lacks corresponding translations. In an embodiment, the system service may also manage library binaries (e.g., libraries provided by the operating system and/or user-provided libraries). The system may still further comprise a persistent translation cache stored within the memory. The persistent translation cache may store one or more translations, wherein a given translation corresponds to at least a portion of the one more application binaries. The one or more translations may be for execution in the second execution environment, wherein: the translation of the one or more application binaries may include an object-level translation of the one or more application binaries generated prior to the execution of the one or more applications represented by the one or more application binaries; and the one or more processors may be configured to execute the cached translation of the one or more application binaries within the runtime code module when the operating system calls for the execution of the one or more application binaries.

In an embodiment, the first execution environment may comprise a source instruction set and the second execution environment may comprise a target instruction set different than the source instruction set. In an embodiment, code signatures may be generated for each page that includes at least a portion of a translation of the one or more application binaries. A data structure storing the code signatures may be encrypted with a key unique to the system (e.g., a secure enclave processor coupled to the one or more processors and the memory may be configured to generate the unique key). In an embodiment, the object-level translation may comprise a translation of a library used by the one or more application binaries during execution. In an embodiment, the object-level translation may comprise a translation of a plug-in used by the one or more application binaries during execution.

In an embodiment, the system service may be configured to generate a hash value based on information associated with the one or more application binaries. The system service may store the generated hash value in an associative array in the memory. The generated hash value may be used to determine if the one or more application binaries are available in the persistent translation cache and to determine if the one or more application binaries have been modified. When the one or more application binaries has been modified, the system may be configured to: remove the translation of the one or more application binaries from the persistent translation cache; and generate a new translation.

In an embodiment, the runtime code module may be configured to determine if the one or more application binaries corresponding to the executing translation has been made writeable. When the one or more application binaries has been made writeable, the system may be further configured to: remove target addresses associated with the one or more application binaries from a global indirect branch table; unlink translations stored in the runtime translation cache that directly jump to the removed translations; advance a global counter; halt the execution of threads related to the one or more application binaries; force the threads related to the one or more application binaries to a just-in-time (JIT) translation of the one or more application binaries performed by the runtime code module; and resume the execution of the threads.

In an embodiment, if the one or more application binaries includes self-modifying code, the system may be configured to: write protect a page in the memory in which the one or more application binaries are stored; trap writes to the protected page in an exception handler; remove target addresses associated with the one or more application binaries from a global indirect branch table; unlink translations stored in the runtime translation cache that directly jump to the removed translations; advance a global counter; request threads related to the self-modifying code to handle the invalidation; perform a JIT translation of the self-modifying code; record the global counter value in metadata associated with the translation; update executing threads to a new version of the global indirect branch table; clean removed translations from a return stack associated with the executing threads; insert the target addresses of branches into the translation via lookups to the global indirect branch table; and free translations when all threads reach the global counter value.

In an embodiment, a system may include one or more processors configured to execute instructions defined in a first instruction set architecture; and a non-transitory computer accessible storage medium coupled to the one or more processors. The non-transitory computer accessible storage medium may store: one or more application binaries having instructions defined in a second instruction set architecture different from the first instruction set architecture; a persistent translation cache storing one or more translated code sequences corresponding to one or more portions of the one or more application binaries, wherein the one or more translated code sequences perform substantially the same operations, when executed, as the one or more portions of the one or more application binaries perform; and a binary translator comprising a system service executable in a separate address space from the application binaries and a runtime code module executable in an address space with the application binaries. The system service may be configured to manage the persistent translation cache, and the runtime code module may be configured to manage just-in-time (JIT) translations of the application binaries for which there are no translated code sequences in the persistent translation cache.

In an embodiment, the system service may be configured to: check the persistent translation cache for a corresponding translated code sequence responsive to launching a given application binary of the one or more application binaries, and provide the corresponding translated code sequence to the runtime code module based on detecting the corresponding translated code sequence in the persistent translation cache. Similarly, libraries used by the given application binary may have translated sequences, the system service may check the persistent translation cache for translated libraries used by the launching application. The translated libraries may be provided for the launching application binary. Checking the persistent translation cache may be based on a hash value generated based on the given application/library binary. The hash value may be different from a previously-generated hash value if the given application binary has been modified after the corresponding translated code sequence was generated. In an embodiment, a first translated code sequence of the one or more translated codes sequences in the translation cache is generated when a corresponding application binary is installed in the system. In an embodiment, a first translated code sequence of the one or more translated codes sequences in the persistent translation cache is generated when a corresponding application binary is initially launched in the system. In an embodiment, a first translated code sequence of the one or more translated codes sequences in the runtime translation cache is generated as a JIT translation of a corresponding application binary when the corresponding application binary was previously launched in the system.

In an embodiment, a method may comprise launching a first application binary for execution in a system. The first application binary may be written for a first execution environment and one or more processors in the system may be configured to execute application binaries in a second execution environment different from the first execution environment. The method may further comprise determining if a translated code sequence generated by a binary translator is stored in a persistent translation cache in the system. The binary translator may comprise a runtime code module executable in an address space of the application binaries and a system service executable in a different process, and determining if the translated code sequence is stored in the persistent translation cache may be performed by the system service. The method may further comprise performing just-in-time translation of the first application binary by the runtime code module based on the translated code sequence not being cached in the translation cache. The method may further comprise executing the cached translated code sequence within the runtime code module based on the translated code sequence being cached in the translation cache.

BRIEF DESCRIPTION OF THE DRAWINGS

The following detailed description refers to the accompanying drawings, which are now briefly described.

Figure 1:
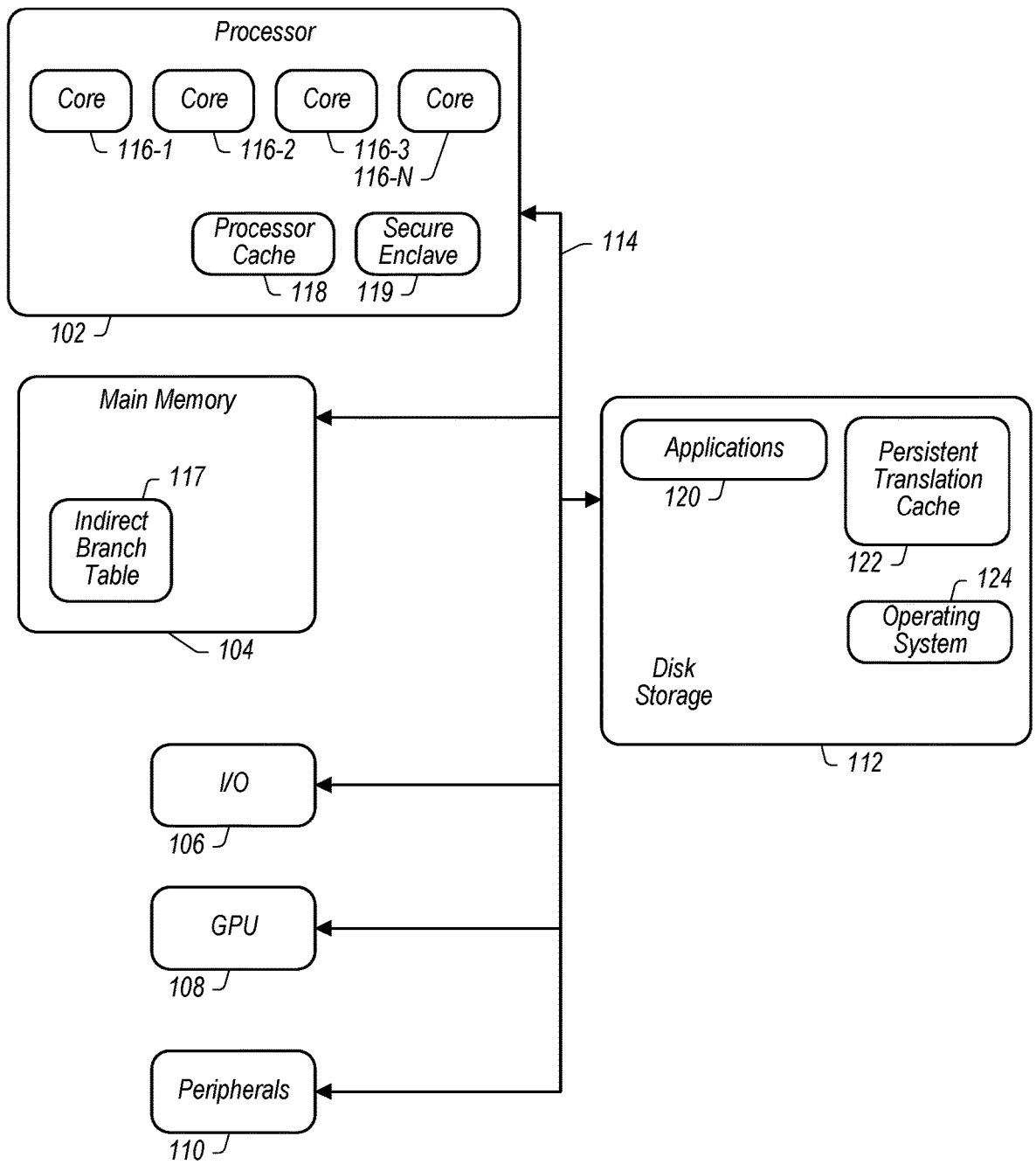
FIG. 1 is a system including a binary translator, consistent with some embodiments.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

FIG. 1 is a system 100 including a binary translator, consistent with some embodiments. As shown in FIG. 1, system 100 includes a processor 102, main memory 104, input/output (I/O) circuitry 106, GPU 108, various peripherals 110, and disk storage 112. Processor 102, system memory 104, I/O 106, GPU 108, peripherals 110, and disk storage 112 may be coupled to one another through bus 114 such that system components 102-112 are agents of bus 114.

Processor 102 may include one or more cores 116-1-116-N and a processor cache 118. Processor 102 may be representative of a general-purpose processor that performs computational operations. For example, processor 102 may be a central processing unit (CPU) such as a microprocessor, a microcontroller, an application-specific integrated circuit (ASIC), or a field-programmable gate array (FPGA). Processor 102 may be a standalone component or may be integrated onto an integrated circuit with other components (e.g., other processors, or other components in a system on a chip (SOC)). Processor 102 may be a component in a multichip module (MCM) with other components.

Consistent with some embodiments, processor 102 may be configured to execute instructions defined in an execution environment, such as an instruction set architecture (ISA), implemented by processor 102 and processor cores 116-1-116-N. ISAs may include the x86 ISA original developed by Intel and the related x86-64 ISA developed by AMD and Intel, ARM and AArch64 ISA from ARM Holdings, Power ISA and PowerPC ISA from IBM/Motorola, RISC-V ISA, etc. Instructions are defined in the instruction set architecture, including its coding in memory, its operation, and its effect on registers, memory locations, and/or other processor state. A given implementation of the ISA may execute each instruction directly, although its form may be altered through decoding and other manipulation in processor 102. Another implementation may decode at least some instructions into multiple instruction operations for execution by cores 116-1-116-N. Some instructions may be microcoded, in some embodiments. Accordingly, the term "instruction operation" may be used herein to refer to an operation that cores 116-1-116-N are configured to execute as a single entity. Instructions may have a one-to-one correspondence with instruction operations, and in some cases an instruction operation may be an instruction. Instructions may also have a one to more than one (one-to-many) correspondence with instruction operations. An instruction operation may be more briefly referred to herein as an "op."

Cores 116-1-116-N may include a variety of execution units, each execution unit configured to execute operations of various types (e.g., integer, floating point, vector, multi-media, load/store, etc.). Cores 116-1-116-N may include different numbers of pipeline stages and various other performance-enhancing features such as branch prediction. Cores 116-1-116-N may include one or more of instruction decode units, schedulers or reservations stations, reorder buffers, memory management units, I/O interfaces, etc.

Processor cache 118 may be a volatile memory or a non-volatile memory. In some embodiments, processor cache 118 may be a static random-access memory (SRAM). Further processor cache may include an instruction cache and a data cache. The processor cache 118 may be organized as a hierarchy of one or more cache levels, such as level 1 (L1), L2, L3, and so on.

Processor 102 may also include a secure enclave processor (SEP) 119 in some embodiments. The SEP may be a self-contained system-on-a-chip (SOC) within processor 102, including its' own processor and one or more security peripherals. SEP 119 may be isolated from the rest of processor 102 such that access to SEP 119 may be strictly controlled. For example, processor 102 may only be able to communicate with SEP 119 through a mailbox mechanism wherein processor 102 may write a message to the mailbox, which SEP 119 may read and respond to the message through the mailbox.

In an embodiment, SEP 119 may manage cryptographic keys for system 100. In an embodiment, software executing on system 100 may request a key, and system 100 may generate a "wrapped" key to the requesting software. The wrapped key is encrypted using a wrapping key, which is transmitted in hardware to the cryptographic hardware in SEP 119. Using the wrapping key, the receiving cryptographic hardware in SEP may decrypt the wrapped key provided by the software, obtaining the actual key that is to be used. Insecure software may not have access to the actual key.

Disk storage 112 may include volatile and/or non-volatile memory and may serve as the long-term storage device for system 100. Disk storage 112 may store one or more applications 120, which when executed by processor 102, may cause system 100 to perform one or more steps, operations, or functions, and may include software applications. Applications 120 may include one or more binaries. Applications 120 may be written for execution in a particular execution environment such as a particular instruction set architecture. In some embodiments, the execution environment for which applications 120 are written is a different execution environment than an execution environment that the processor 102 is designed to execute. In such embodiments, applications 120 are considered to be written for a source execution environment while processor is capable of execution in a target execution environment. As discussed throughout, system 100 may be capable of translating application binaries written for the first or source execution environment for use in the second or target execution environment. Returning to FIG. 1, disk storage 112 may include persistent translation cache 122 and operating system 124. Operating system 124 may include instructions and frameworks for any well-known operating system, such as MacOS X and the like.

More generally, the disk storage 112 and/or the main memory 104 may be examples of a computer accessible storage medium. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD- ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium may store data in a non-transitory manner, where non-transitory in this context may refer to not transmitting the instructions/data on a signal. For example, non-transitory storage may be volatile (and may lose the stored instructions/data in response to a power down event) or non-volatile. The computer accessible storage medium may store various components illustrated in FIG. 1, such as the persistent translation cache 122, the applications 120, and/or the operating system 124.

The I/O circuitry 106 and/or the peripherals 110 may be any set of additional hardware functionality included in the system 100. For example, the peripherals 110 may include video peripherals such as an image signal processor configured to process image capture data from a camera or other image sensor, graphics processing units (GPUs) such as the GPU 108 shown in FIG. 1, video encoder/decoders, scalers, rotators, blenders, video display controllers, displays such as liquid crystal displays (LCDs), light emitting diode displays (LEDs) such as organic LEDs (OLEDs), plasma displays, etc., including displays that are integrated with touch sensing technology to serve as an input device. The peripherals may include audio peripherals such as microphones, speakers, interfaces to microphones and speakers, audio processors, digital signal processors, mixers, etc. The I/O circuitry 106 may include interface controllers for various interfaces external to the system including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included as the peripherals 110 and/or I/O circuitry 106. The peripherals may include other user interface devices such as keyboards, mice, or other pointing devices, etc.

The bus 114 may be an example of a communication fabric. Generally, a communication fabric may be any communication interconnect and protocol for communicating among the components of the system 100. The communication fabric may be bus-based (e.g., the bus 114), including shared bus configurations, cross bar configurations, and hierarchical buses with bridges. The communication fabric may also be packet-based, and may be hierarchical with bridges, cross bar, point-to-point, or other interconnects.

The main memory 104 may include a memory controller and one or more memory devices. The memory controller may generally include the circuitry for receiving memory operations from the other components of the system 100 and for accessing the memory devices to complete the memory operations. The memory controller may be configured to access any type of memory devices. For example, the memory devices may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller may include queues for memory operations, for ordering (and potentially reordering) the operations and presenting the operations to the memory devices. The memory controller may further include data buffers to store write data awaiting write to the memory devices and read data awaiting return to the source of the memory operation. In some embodiments, the memory controller may include a memory cache to store recently accessed memory data. In some cases, the memory cache may also be referred to as a system cache, as opposed to private caches such as processor cache 118, which serve only certain components. The main memory 104 may store various code for execution, such as the application 120, corresponding translations read from the persistent translation cache 122, the operating system 124, etc. In an embodiment, various run-time data structures may be in the main memory 104 as well. For example, the main memory 104 may store a global indirect branch table 117. The global indirect branch table 117 may be a data structure managed by the binary translator to map indirect branch target address from the applications 120 to indirect branch target addresses in the corresponding translated code sequences.

In some embodiments, persistent translation cache 122 may include the translation of binaries developed or written for one execution environment to a second execution environment that is different than the first execution environment. The binaries may include executables, applications, linkers, libraries, and the like. In some embodiments, the binaries may include a Mach-O object. In some embodiments, the translated binaries stored in translation cache may be signed using a key generated by SEP 119 that is unique to system 100 such that the translations will not be available to system 100 unless the translations are signed. Further, persistent translation cache 122 may reside in a read/write partition of disk storage 112 along with operating system 124. More particularly, the translation of a given binary, when executed by the processor 102, may cause the system 100 to perform substantially the same operations in the system 100 that a system would have performed in the system implemented the first execution environment (e.g., ISA) for which the binary was written. There may be some differences in the operation, since the second execution environment is different from the first execution environment. For example, in some cases, multiple instructions in the ISA implemented by the processor 102 may be used to perform the same operation as a single instruction in the ISA to which the binary was written. Thus, the amount of time elapsing during execution of the binary may differ as compared to executing the original binary in its original execution environment. However, the functionality of the original binary may be maintained, e.g., identically in the translated binary.

Figure 2:
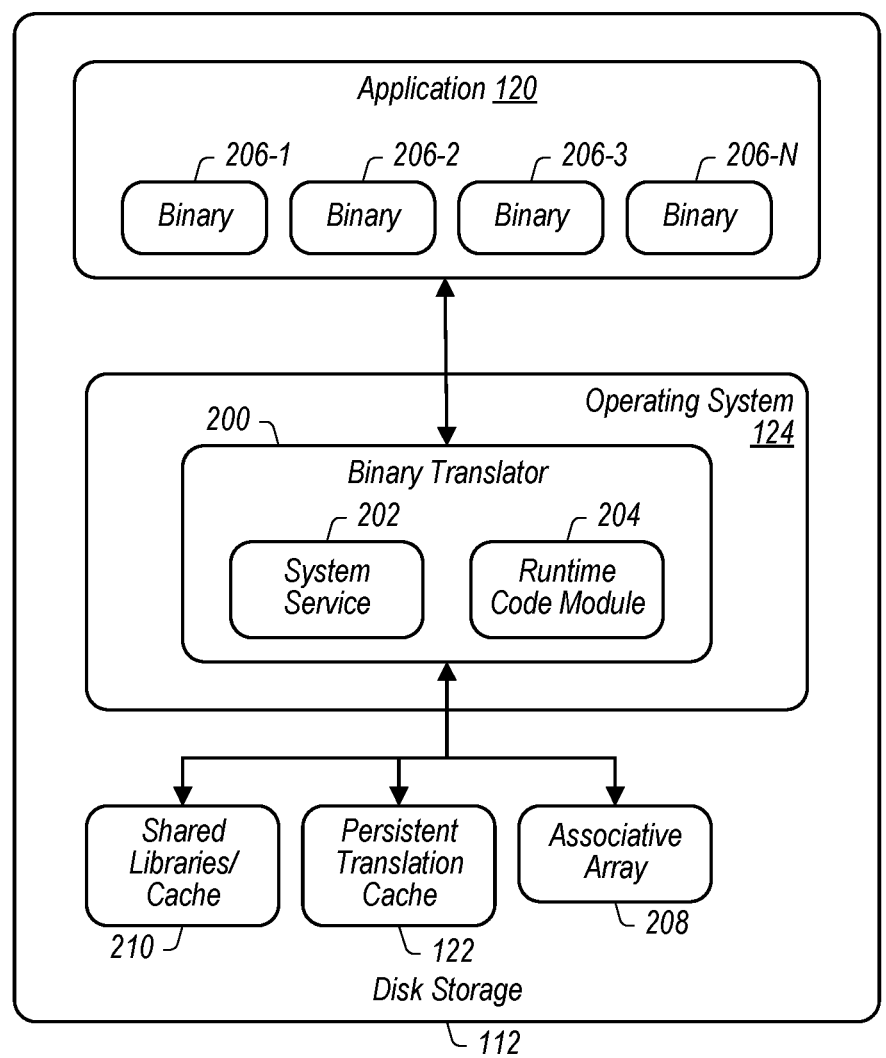
FIG. 2 is a diagram illustrating binary translation system within a disk storage of the system of FIG. 1, consistent with some embodiments.

FIG. 2 is a diagram illustrating binary translation system 200 within disk storage 112 of system 100, consistent with some embodiments. As shown in FIG. 2, binary translation system (or just "binary translator") 200 includes a system service 202 and a runtime code module 204. In some embodiments, runtime code module 204 is a runtime service that exists in an address space corresponding to application 120 within disk storage 112 and is where translated application 120 is executed in the second execution environment. System service 202 may be responsible for managing access to translations stored in the persistent translation cache 122, and the coherency of translations stored in persistent translation cache 122 in the case of self-modifying code or other dynamically modified code. The system service 202 may manage scheduling of translations when a cached translation does not exist or is invalidated, and may perform translations. In particular, system service 202 may be responsible for handling calls to persistent translation cache 122, determining a hash value associated with one or more binaries 206-1-206-N(hereinafter referred to as binaries 206) of application 120 and writing to and performing lookups from global hash table 208. In some embodiments, system service 202 may handle requests to binary translator 200 via interprocess communications (IPC) calls from operating system 124. Runtime code module 204 may be responsible for handling just-in-time (JIT translations) and may also be responsible for monitoring the state of registers updated by the application during execution (e.g., the registers defined in the source ISA or execution environment to which the application 120 is originally written).

As further shown in FIG. 2, application 120 includes application binaries 206. As discussed previously, binaries 206 may include executables, applications, linkers, libraries, and the like. In some embodiments, binaries 206 may include a Mach-O object. In some embodiments, disk storage may further include shared libraries and/or a shared cache 210 which may store libraries and a cache that may be utilized by multiple applications, services, and/or operating system 124 itself.

In some embodiments, binaries 206 may be translated when they are installed onto system 100 via a standard or trusted installation process associated with operating system 124. The translation process may be performed as part of the installation (e.g., the installation may not complete until the translation completes) or as a background process during and/or following installation. For other installations, such as side-loading or through removable disk media, binary translator 200 may translate binaries 206 on the first launch of application 120 or a first use of any binary 206. If binary 206 cannot be translated due to malformation or translation failure due to misprediction, runtime code module 204 includes a just-in-time (JIT) translation process that will translate a smaller set of instructions associated with that binary 206 as system 100 attempts to execute application 120. When operating system 124 is being updated, system service 202 may delete all cached translations within persistent translation cache 122 and initiate a background process to retranslate all binaries 206 that had been previously cached. Further, when binary translator 200 is added to a system 100, binary translator 200 may translate shared libraries and shared cache 210 related to operating system 124.

To perform translations of binaries written for execution in a first execution environment for use in a second execution environment, system service 202 may identify one or more entry points into a binary 206 to determine the potential parts of the binary that may be code and require translation. In some embodiments, the first execution environment may include support for variable-size instructions whereas the second execution environment may only include support for fixed-size instructions. In these embodiments, system service 202 may find potentially valid instructions for translation at multiple steps along the way since it may not know instruction boundaries based on the size of the instructions. The system service 202 may identify entry points into binary 206 using information that is provided by a static linker for a dynamic linker. In particular, in some embodiments operating system 124 may include a dynamic linker that links the application to shared libraries 210 and places specific code at address points in disk storage 112 that application 120 is coded with at link time, which allows application 120 to use a machine-specific call or jump instructions to one of those address points when it needs to utilize the dynamic linker instead of interacting with the dynamic linker directly. System service 202 may utilize those specific address points as entry points for identifying code that requires translation. Once the entry points have been identified and code requiring translation has been identified, system service 202 may translate the identified code written for the first execution environment to code that can be executed in the second execution environment. The system service 202 may save the translation in persistent translation cache 122 in disk storage 112, and update associative array 208 by performing a hash of application binary 206 and storing that hash in the array 208.

Figure 3:
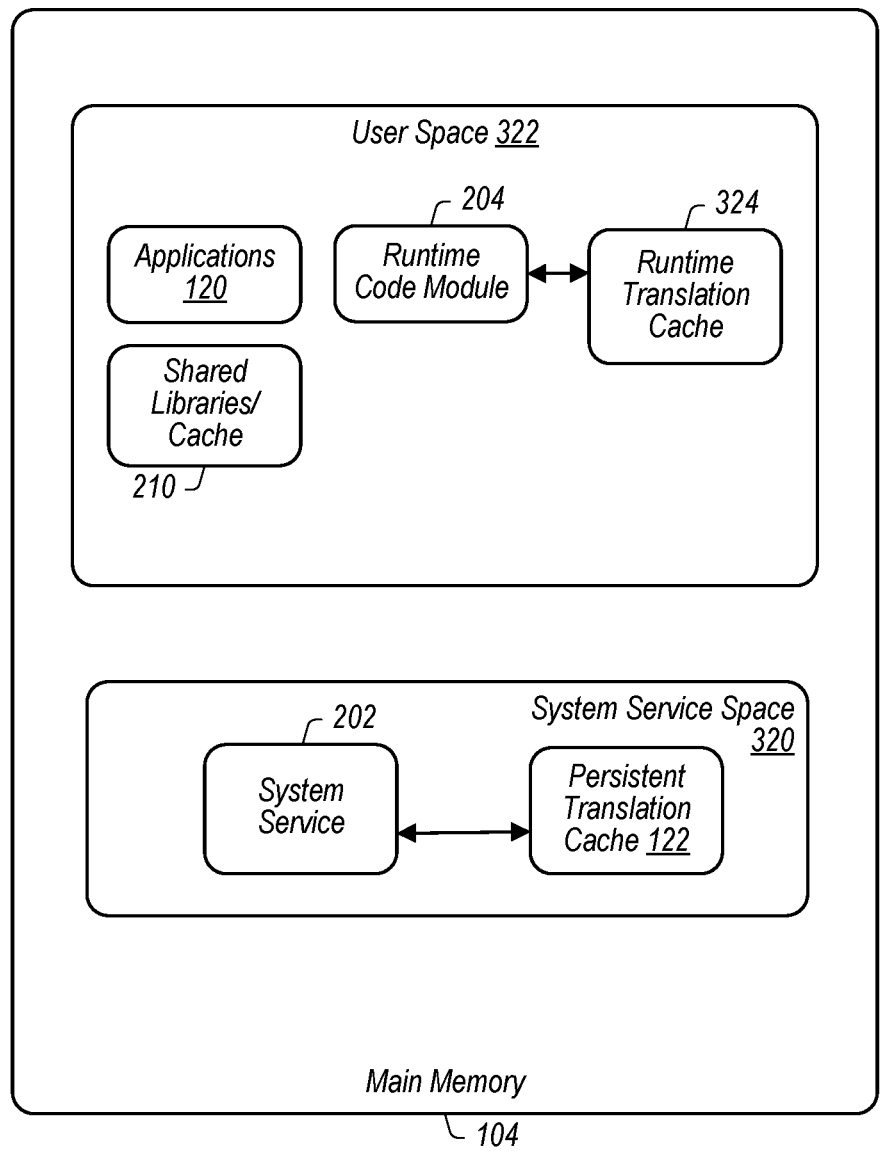
FIG. 3 is a diagram of one embodiment of the binary translation system in system memory during execution, consistent with some embodiments.

FIG. 3 is a block diagram illustrating one embodiment of the main memory 104 during operation. Various portions of the address space may be mapped by the operating system 124 as system service space 320 and user (or unprivileged) space 322. For example, the operating system 124 may define pages of memory as privilege space or user space 322 in a virtual to physical address translation mechanism, as one of the page attributes in the translation. The privilege space may be the address space in which the operating system 124 itself executes, or at least a kernel portion of the operating system 124 in kernel-based embodiments. The user space 322 may be the space in which the applications 120 execute. The system service space 320 may also be user space, but may be separate from the address space in which a translated application runs (e.g., the system service may be a different process than the translated application, whereas the runtime code module 204 may executed in the address space of the translated application). Generally, code executing in the user space 322 may not be permitted to execute certain instructions that control critical processor state, that the operating system 124 reserves for itself.

As mentioned previously, the system service 202 may execute in the system service space 320, and may maintain the persistent translation cache 122. persistent translation cache 122. The persistent translation cache 122 may be in the user space so that the translated code may be executed by the processor 102, but access to the persistent translation cache 122 may be controlled by the system service 202 (e.g., generating hashes and checking for translations when a given application 120 is invoked for execution). Alternatively, translations from the persistent translation cache 122 may by mapped into memory when the corresponding application is launched or an entry point is invoked that corresponds to a cache translation. The translation may be loaded into memory and a pointer to the translation may be provided to the runtime code module 204. The translation may be loaded in the application's address space in user space 322. If multiple threads are executing the same translation, the translation may be mapped into each thread's address space. Alternatively, the threads may share a common copy of the translation. There may be other points in time at which translations are loaded from the persistent translation cache 122. For example, a dynamic linker may link various dynamically-linked libraries to an application. If the dynamically-linked library is written for the first execution environment, the dynamic linker may request that the runtime code module 204 determine if there is a translation in the persistent translation cache 122. The runtime code module 204 may query the system service to determine inf there is a translation, and may determine the size of the translation. Alternatively, the dynamic linker may query the system service and provide the size to the runtime code module to allocate memory for the translated library. The dynamic linker may load the original library code, and may request that the runtime code module 204 load the corresponding translation and provide a pointer to the translation.

As mentioned above, the runtime code module 204 executes in the user space 322 (and more particularly in the address space of the application 120, when the application 120 is written to an ISA that is different from that of the processor 102). The runtime code module 204 may maintain a runtime translation cache 122 for JIT translations generated by the runtime code module 204 when a corresponding translation for an application 120, or a portion thereof, is not found in the persistent translation cache 122.

In an embodiment, the JIT translations generated by the runtime code module 204 may be installed as translations in the persistent translation cache 122 as well. While the JIT translations may often cover a small portion of the application 120 that is generated dynamically as the application is executed, if the JIT translation begins to cover a large enough portion of the overall application (e.g., a threshold amount), the JIT translation may be installed in the persistent translation cache 122 by the system service 202 and retained for execution at a later point. In other embodiments, the JIT translations may not be installed in the persistent translation cache 122, and thus may be generated by the runtime code module 204 each time the corresponding application is called. In yet another embodiment, the generation of a JIT translation may serve as a hint to the binary translator 200 to consider a translation to be installed in the persistent translation cache 122. If the binary translator 200 determines that a translation should be performed, the binary translator 200 may perform the translation separate from the JIT translation and may install the separately-generated translation in the persistent translation cache 122. A variety of factors may determine if a JIT translation causes a translation for the persistent translation cache 122 (e.g., frequency at which the JIT translation is used, or generated over time during different executions of the application; whether or not the JIT translation is due to self-modifying code, whereby self-modifying code may not be installed in the persistent translation cache 122; etc.).

The shared libraries/cache 210 may also be in the user space 322, or may be in the privileged space or a combination of the spaces (e.g., the libraries 210 may be in the privileged space or the user space 322 on a library-by-library basis.

Figure 4:
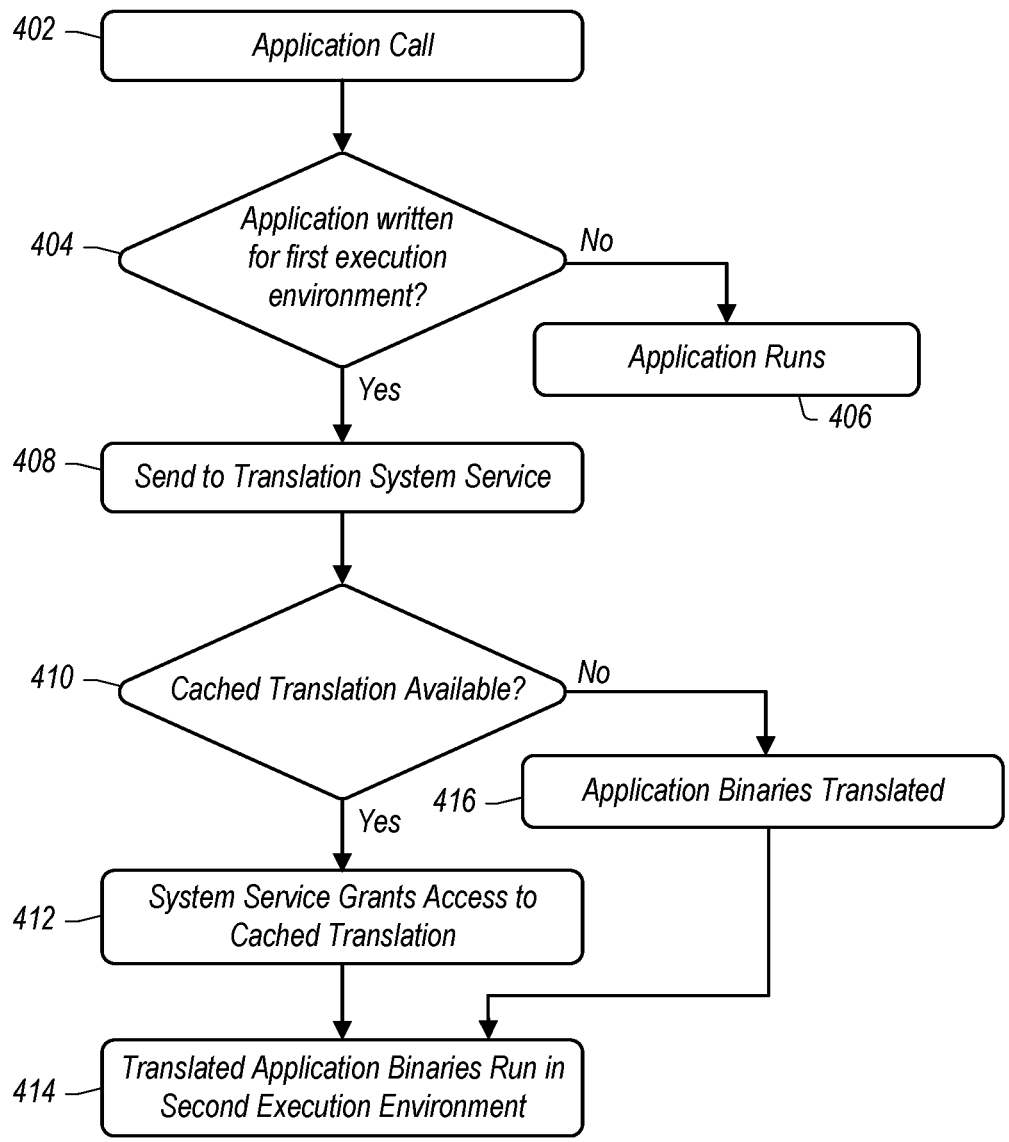
FIG. 4 is a flowchart illustrating a method of handling cached binary translations, consistent with some embodiments.

FIG. 4 is a flowchart illustrating a method 400 of handling cached binary translations, consistent with some embodiments. As shown in FIG. 4, when an application 120 is called (step 402) a check may be made to determine if application 120 was written for the first execution environment (step 404). In some embodiments, the application, such as applications 120 may include one or more binaries 206 that are written for execution in a first execution environment, such as x86 or x86-64 and the like, which requires a processor capable of executing those instructions. If application 120 is not written for the first execution environment and is instead capable of running natively within the second execution environment, which may be ARM or AArch64 for example, application 120 may run natively (step 406). If application 120 is written for the first execution environment, it may be passed to system service 202 of binary translation system 200 (step 408). In some embodiments, code for passing the application to system service 202 may be part of the runtime code module 204. System service 202 may calculate a hash value based on metadata associated with the one or more binaries 206 of the application and/or binary 206 itself and compare the generated hash to one or more hash values in associative array 208 to determine if a cached translation is present in persistent translation cache 122 or if an expected cached translation is not available (step 410). If a match is found in array 208, the cached translation may be used by granting access to the cached translation (by the system service 202 to the runtime module 204). The cached translation may be mapped into memory (e.g., in the application's user address space 322 as shown in FIG. 3), using standard operating system calls (step 412). The translated application binaries may then be executed in the second execution environment within runtime code module 204 (step 414). When the hash does not match, application 120 may not have been previously translated. In this instance, system service 202 may begin the background process of translating application binaries 206 (step 416) and installing the resulting translation in the persistent translation cache 122. In parallel, the runtime code module 204 may generate a JIT translation of the code for current execution. The JIT translation may be executed in the second execution environment within runtime code module 204 (step 414).

Figure 5:
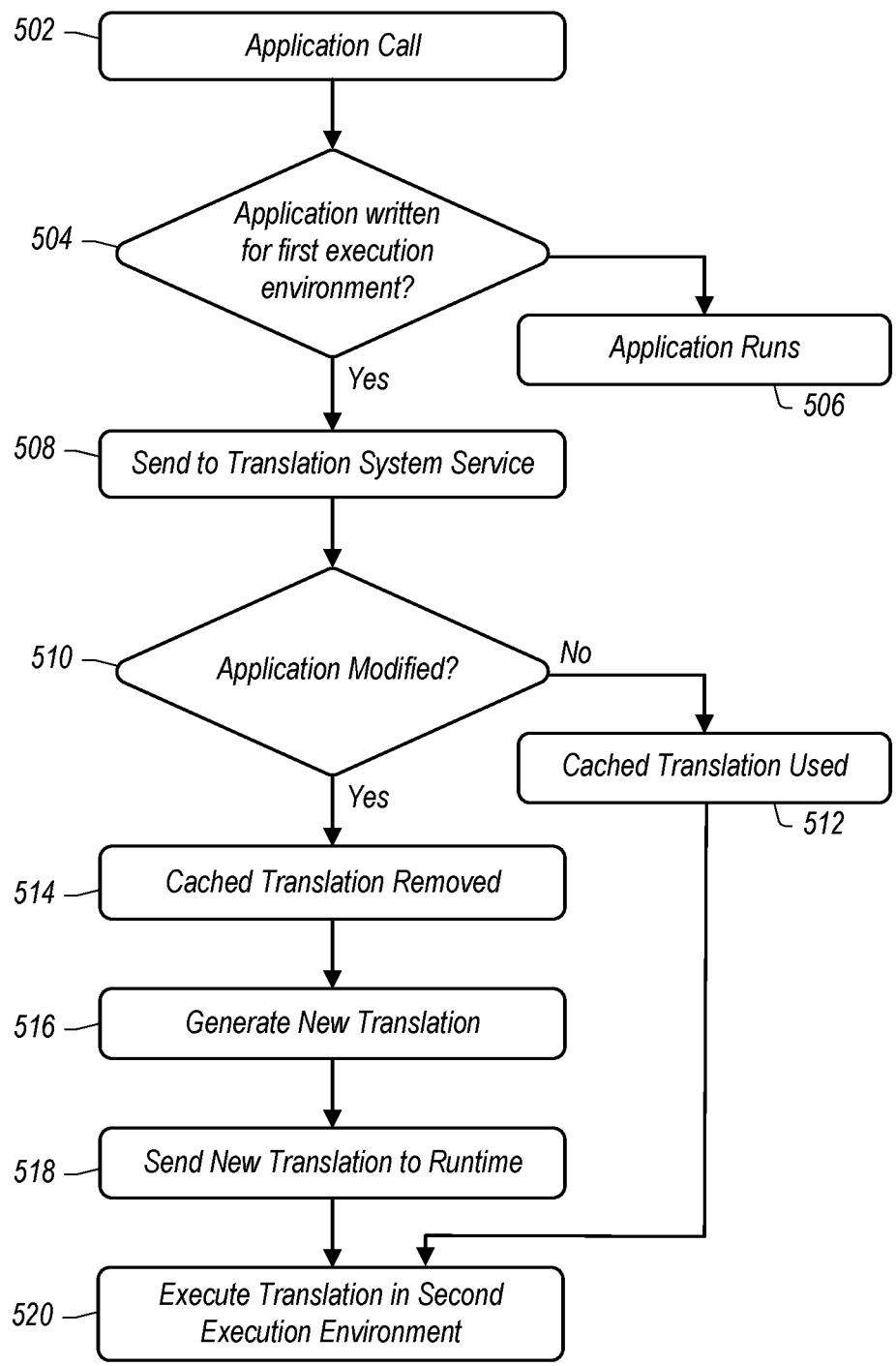
FIG. 5 is a flowchart illustrating a method of handling modifications to the binaries associated with a cached translation, consistent with some embodiments.

FIG. 5 is a flowchart illustrating a method 500 of handling modifications to binaries associated with cached translations, consistent with some embodiments. As shown in FIG. 5, when an application 120 is called (step 502) a check may be made to determine if the application was written for the first execution environment (step 504) (e.g., similar to the embodiment of FIG. 4). In some embodiments, the application, such as applications 120 may include one or more binaries 206 that are written for execution in a first execution environment, such as x86 or x86-64 and the like, which requires a processor capable of executing those instructions. If application 120 is not written for the first execution environment and is instead capable of running natively within the second execution environment, which may be ARM or AArch64 for example, the application may run natively (step 506). If the application is written for the first execution environment, it may be passed to system service 202 of binary translation system 200 by runtime code module 204 (step 508). System service 202 may calculate a hash value based on metadata associated with the one or more binaries 206 or binary 206 itself of the application and compare the hash to one or more values in associative array 208 to determine if a cached translation is present in persistent translation cache 122 or if the application has been modified (step 510). If a match is found in array 208, the cached translation may be used by granting access to the cached translation, which may then map that particular application onto memory using standard operating system calls (step 512). The translation may be executed in the second execution environment with runtime code module 204 (step 520). When the hash does not match, application 120 may have been modified and require a new translation. In this instance, system service 202 may remove the cached translation (step 514), and system service 202 may generate a new translation (step 516), then send the generated new translation to runtime code module 204 (step 518) for execution within the second execution environment within runtime code module 204 (step 520).

Consistent with some embodiments, binary translation system 200 may also manage multi-threaded resources. In some embodiments, runtime code module 204 may use a particular time-based handling for managing its resources, which is known as epoch-based reclamation. In epoch-based reclamation, each executing thread on system 100 may be associated with a current epoch that indicates when the thread last exited runtime code module 204 and discarded any pointers into shared state. Threads can asynchronously request that other threads advance their epoch, or that they perform one of a small number of tasks. When all threads have advanced to a sufficiently recent epoch, it is possible to deallocate shared resources.

Figure 6:
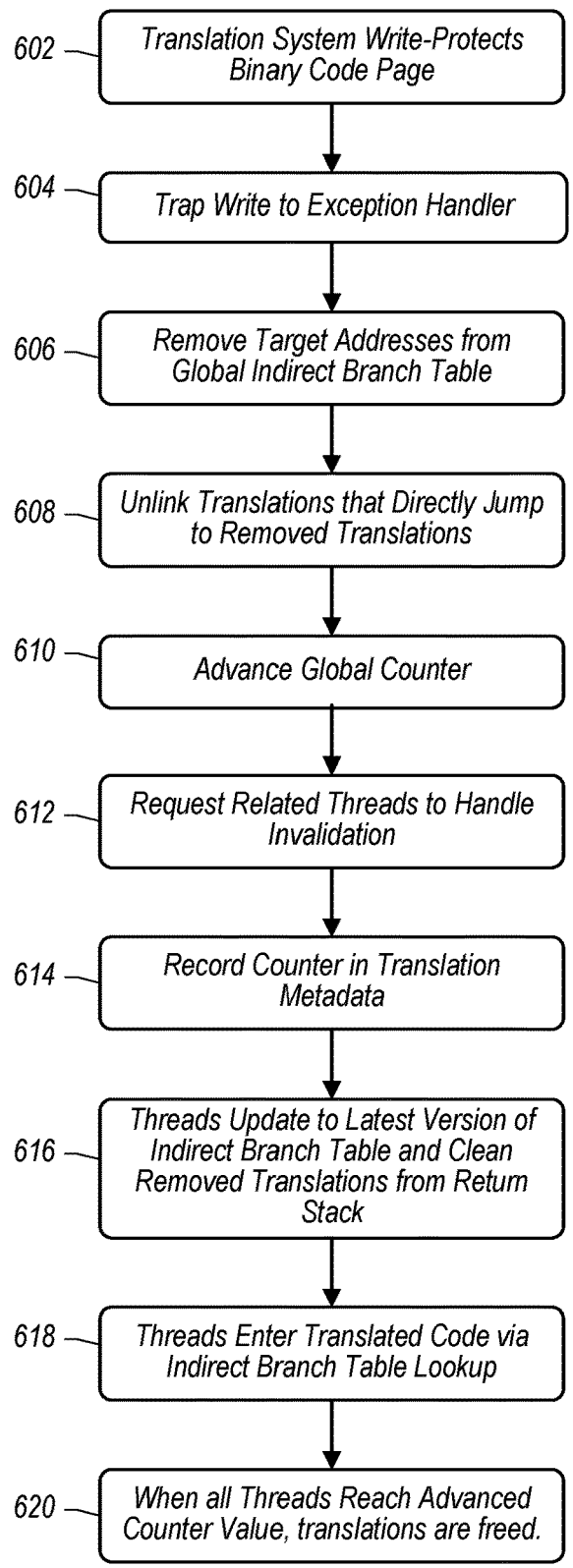
FIG. 6 is a flowchart illustrating a method for handling self-modifying code, consistent with some embodiments.

FIG. 6 is a flowchart illustrating a method 600 for handling self-modifying code, consistent with some embodiments. Some execution environments, for example x86 and x86-64 allow applications to employ self-modifying code and binary translation system 200 may also be capable of handling self-modifying code. In some embodiments, the first execution environment may aggressively maintain coherence between the data and instruction caches, as well as the instruction pipeline, which may invoke self-modifying code as it is generated. To handle such self-modifying code, binary translation system 200 may initially write-protect any code page in memory of a binary 206 written for the first execution environment which has been translated into code written for the second execution environment (step 602). Then, if a write occurs, which may be either a store instruction, or an attempt to modify that page in memory via a system call or the like, system service 202 may trap that write to an exception handler in runtime code module 204 (step 604). The exception handler in runtime code module 204 may then remove any branch targets to that page from the global indirect branch table 117 (step 606) and unlink any translations that directly jump to the affected translations (step 608). Then, the exception handler may advance a global epoch counter (step 610), asynchronously request that all other threads handle this code invalidation (step 612) and records the advanced global epoch counter value in metadata for each of the affected translations (step 614). When handling the asynchronous request, other threads update to the latest version of the indirect branch table 117, clean any removed translations from their return stack cache (or simply clear the entire cache) (step 616), and enter translated code by performing a fresh lookup from the indirect branch table 117 (step 618). Then, the execution of the original thread may continue with the trapping write. When all other threads reach the newly updated epoch, the affected translations can be freed from the lock and proceed to execution (step 620). Is it noted that the method 600 may be handled by the runtime code module 204 in the application's address space, in an embodiment.

Figure 7:
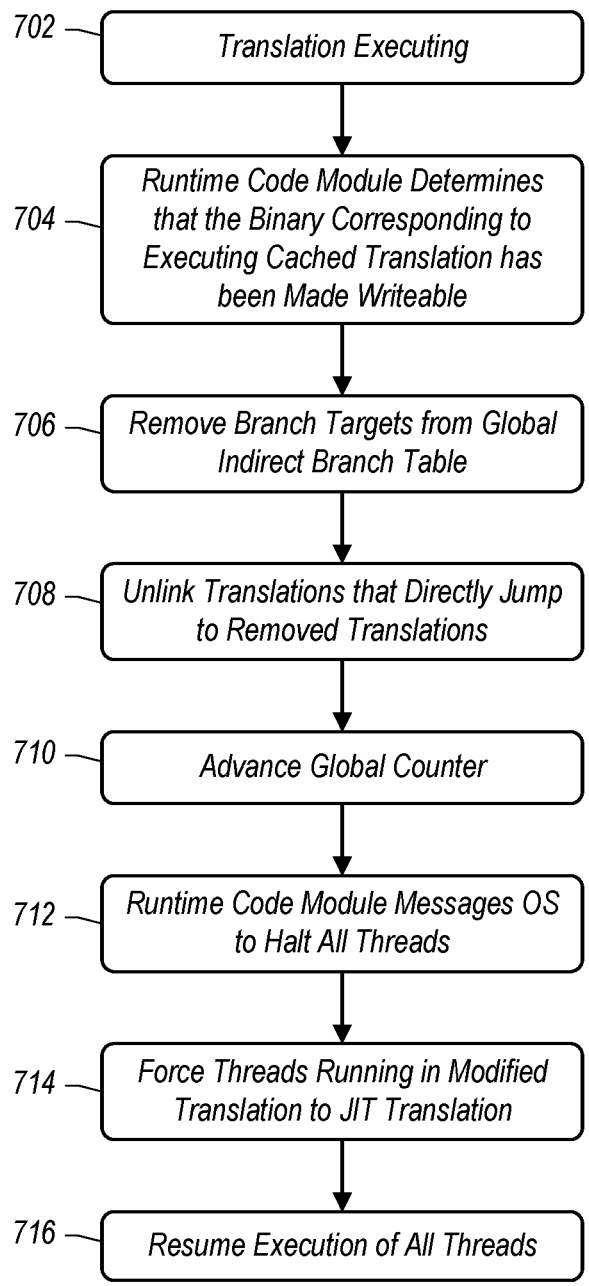
FIG. 7 is a flowchart illustrating a method of handling modifications to the original binary corresponding to an executing cached translation, consistent with some embodiments.

FIG. 7 is a flowchart illustrating a method 700 of handling modifications to the original binary corresponding to an executing cached translation, consistent with some embodiments. As shown in FIG. 6, when a cached translation is executing within runtime code module 204 (step 702), runtime code module 204 may determine that an original binary corresponding to the cached translation that is currently executing has been made writeable (step 704). In some instances, an application 120 corresponding to the cached translation may modify binaries 206 during execution by making the binary writeable indicating that it is likely to be modified, which may render the previously cached translation of binaries 206 invalid. The exception handler in runtime code module 204 may then remove any branch targets to that page from the global indirect branch table 117 (step 706) and unlink any translations that directly jump to the affected translations (step 708). In an embodiment, the binary translator 200 may maintain a mapping from original (untranslated) code addresses that are translation entry points to the corresponding translations themselves. The mapping allows the binary translator 200 to efficiently perform ordered queries. When affected translations are invalidated to a write to code in a given page, the mapping for any addresses in that age may be invalidated.

The exception handler may advance the global epoch counter (step 710). Runtime code module 204 may then send a message to operating system 124 to halt all executing threads (step 712). The runtime code module 204 may then check if any threads were running the cached translation and, if they so, runtime code module 204 forcibly redirects them to a JIT translation (step 714) generated by the runtime code module 204. For example, each thread's thread-specific context may include a variable that indicates the last global epoch change that the thread observed. The variable mat be written atomically by the thread, and read atomically by other threads. The runtime code module may resume executing all threads (step 716) in the second execution environment within runtime code module 204. In some embodiments, JIT translations are not cached in disk storage 112 but only temporarily saved within the writeable address space of runtime code module 204.

In some embodiments, binary translation system 200 may also be capable of handling indirect branches. In particular, indirect branch lookups may be performed using global indirect branch table 117, where multiple threads can read the table without synchronization, but writers take a lock to modify it. When table 117 size is increased, then only threads that update their local table pointers to point to the latest version get the new version, which occurs if necessary when the thread returns back to translated code from runtime code module 204. In some embodiments, reclamation of old table 117 versions (after a table grows) is handled using epoch-based reclamation. Deletions may handled in-place, since table 117 is linearly probed. There is a race condition where one thread can be reading while another is deleting, falsely detecting a cache miss. This may be handled by having the persistent translation cache 122 miss code path take the same lock that is being used by the writer. Function returns are a specific kind of indirect branch, which may be handled by using a software version of a return stack branch predictor. Pairs of program counters from the first execution environment and translated program counters for the second execution environment are stored in a stack. Upon a return, the return address is checked to see if it matches the stored address associated with the program counter for the first execution environment, and the saved translated program counter is returned if it does. Otherwise, indirect branch handling is handled as normal.

In some embodiments, as system 100 is executing translated applications 120, runtime code module 204 may monitor the execution of the translated instructions to improve the accuracy of the translation by ensuring that exceptions, traps, and other interruptions of instruction execution occur at instructions in the target execution environment that corresponding to a beginning or end of an instruction in the source execution environment (an "instruction boundary"). That is, a given instruction in the source ISA may translate to multiple instructions in the target ISA. If instruction execution in the translated instruction sequence were interrupted at one of the instructions that does not represent the boundary of a source instruction, the register state and/or other architected state of the processor 102 may reflect the partial execution of a source ISA instruction, which is not possible on a processor that executes the source ISA natively. For example, operating system 124 may include various mechanisms to query registers after stopping execution in the translated instruction sequence (e.g., for debug purposes). Runtime code module 204 may monitor the execution of translated instructions to ensure that at every point of execution in the second execution environment the runtime code module can fast-forward or rewind execution by a small number of instructions to produce accurate register states in accordance with the first execution environment as if the binary was actually being executed precisely with respect to instruction boundaries observed in the first execution environment. In some embodiments, this process may allow the execution of the translated instructions to appear as if they are being atomically executed as if being executed within the first execution environment instead of being executed in the second execution environment using instructions designed for the second execution environment.

Figure 8:
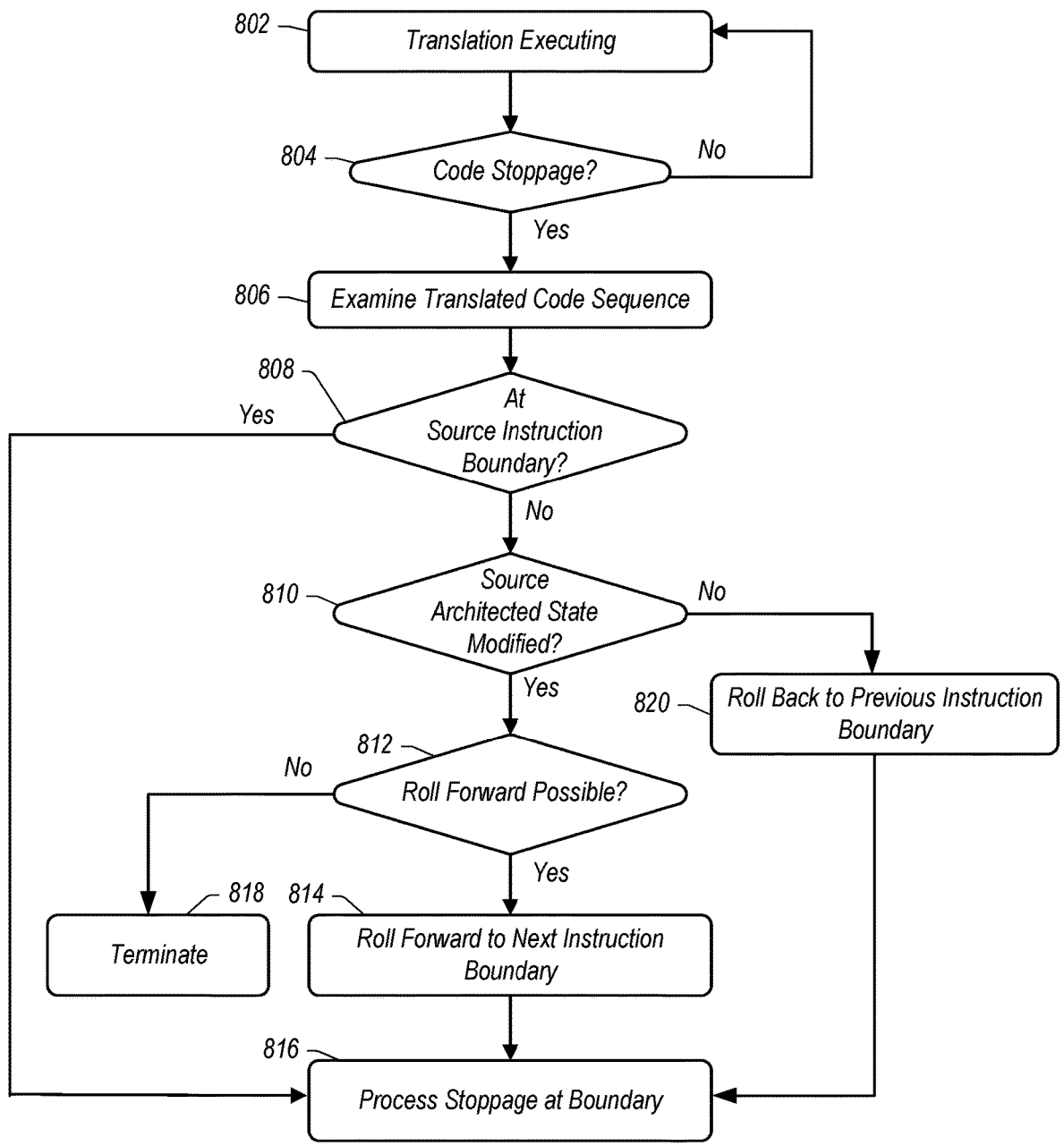
FIG. 8 is a flowchart illustrating one embodiment of a method of handling exceptions or other interruptions (code stoppages) in translated code.

FIG. 8 is a flowchart illustrating one embodiment of a method 800 of handling exceptions or other interruptions (code stoppages) in translated code. An exception may be a synchronous stoppage of code due to a condition detected with respect to an executing instruction. An interrupt may, in some cases, be asynchronous to instruction execution (e.g., an external interrupt sourced from a device, or an interrupt issued by another thread). Interrupts are taken when an instruction completes execution, but may have nothing to do with the execution of that instruction. When exceptions and interrupts occur during execution of translated code, they occur between translated instructions but may no occur at instruction boundaries of a corresponding source instruction because there may be more than one translated instruction used to emulate the source instruction.

Accordingly, a translation is executing (step 802). If no code stoppage is detected (decision step 804, "no" leg), translation execution may continue (step 802). On the other hand, if a code stoppage is detected (decision step 804, "yes" leg), the runtime code module 204 may examine the code sequence to determine if the code stoppage occurred at a source instruction boundary (step 806). For example, in an embodiment, the binary translator 200 may generate translations following a set of rules, and thus examination of the code sequence (disassembling the instructions near the stoppage) may allow the binary translator 200 to determine where a given source instruction's boundaries are and what the progress of the source instruction was at the time of stoppage. If the stoppage occurred on an instruction boundary (decision step 808, "yes" leg), the stoppage may be processed at the instruction boundary (step 816). If not (decision step 808, "no" leg), the runtime code module 204 may determine if any architected state of the source execution environment has been modified (and whether or not the modification may be reversed to restore the state at the beginning of the source instruction) (decision step 810). If no architected state has been modified, or if architected state has been modified and reversal is possible and desirable rather than rolling forward (decision step 810, "no" leg), the runtime code module 204 may roll back the state to the beginning of the source instruction (step 820) and the stoppage may be processed (step 816). If architected state has been modified irreversibly, or if it is not desirable to roll back (decision step 810, "yes" leg), the runtime code module may determine if roll forward is possible via the runtime code module 204 emulating the remainder of the source instruction execution, modifying architected state with the results of the instruction (decision step 812). If roll forward is possible (decision step 812, "yes" leg), the runtime code module 204 may roll forward to the next instruction boundary (block 814) and the stoppage may be processed at that instruction boundary (step 816). If roll forward is not possible (decision step 812, "no" leg), the translated code sequence execution may be termination (step 818).

The present disclosure includes references to "an" "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A system, comprising:
one or more processors configured to execute application binaries in a second execution environment different than a first execution environment; and
a memory storing:
an operating system and one or more application binaries, the one or more application binaries written for execution in the first execution environment;
a binary translator comprising a cache management system service executable in a first address space and a runtime code module executable in a second address space of the application binaries, wherein the first address space is separate from the second address space, wherein the cache management system service is configured to manage translations of the application binaries in a translation cache including handling calls to the translation cache, and wherein the runtime code module is configured to manage just-in-time (JIT) translations of the application binaries for which the cache management system service lacks corresponding translations; and
the translation cache storing one or more translations, wherein a given translation corresponds to at least a portion of the one or more application binaries, and wherein the one or more translations are for execution in the second execution environment, wherein:
the translation of the one or more application binaries includes an object-level translation of the one or more application binaries generated prior to the execution of the one or more applications represented by the one or more application binaries; and
the one or more processors are configured to execute the cached translation of the one or more application binaries within the runtime code module when the operating system calls for the execution of the one or more application binaries.

2. The system as recited in claim 1, wherein the first execution environment comprises a source instruction set, and the second execution environment comprises a target instruction set different than the source instruction set.

3. The system as recited in claim 1, wherein the translation of the one or more application binaries is encrypted with a key unique to the system.

4. The system as recited in claim 3, further comprising:
a secure enclave processor coupled to the one or more processors and the memory configured to generate the unique key.

5. The system as recited in claim 1, wherein the object-level translation comprises a translation of a library used by the one or more application binaries during execution.

6. The system as recited in claim 1, wherein the object-level translation comprises a translation of a plug-in used by the one or more application binaries during execution.

7. The system as recited in claim 1, wherein the cache management system service is configured to generate a hash value based on information associated with the one or more application binaries.

8. The system as recited in claim 7, wherein the cache management system service stores the generated hash value in an associative array in the memory.

9. The system as recited in claim 8, wherein the generated hash value is used to determine if the one or more application binaries are available in the translation cache and to determine if the one or more application binaries have been modified.

10. The system as recited in claim 9, wherein when the one or more application binaries has been modified, the system is configured to:
remove the translation of the one or more application binaries from the translation cache; and
generate a new translation.

11. The system as recited in claim 1, wherein the runtime code module is configured to determine if the one or more application binaries corresponding to the executing translation has been made writeable, wherein when the one or more application binaries has been made writeable, the system is further configured to:
remove translations associated with the one or more application binaries from a global indirect branch table;
unlink translations stored in the translation cache that directly jump to the removed translations;
advance a global counter;
halt the execution of threads related to the one or more application binaries;
force the threads related to the one or more application binaries to a just-in-time (JIT) translation of the one or more application binaries performed by the runtime code module; and
resume the execution of the threads.

12. The system as recited in claim 1, wherein if the one or more application binaries includes self-modifying code, the system is configured to:
write protect a page in the memory in which the one or more application binaries are stored;
trap writes to the protected page in an exception handler;
remove translations associated with the one or more application binaries from a global indirect branch table in the processor;
unlink translations stored in the translation cache that directly jump to the removed translations;
advance a global counter;
request threads related to the self-modifying code to handle code invalidation;
perform a JIT translation of the self-modifying code;
record the global counter value in metadata associated with the translation;
update executing threads to a new version of the global indirect branch table;
clean removed translations from a return stack associated with the executing threads;
insert the translation into the threads via lookups to the global indirect branch table; and
free translations when all threads reach the global counter value.

13. A system, comprising:
one or more processors configured to execute instructions defined in a first instruction set architecture; and
a non-transitory computer accessible storage medium coupled to the one or more processors, wherein the non-transitory computer accessible storage medium stores:
one or more application binaries having instructions defined in a second instruction set architecture different from the first instruction set architecture;
a translation cache storing one or more translated code sequences corresponding to one or more portions of the one or more application binaries, wherein the one or more translated code sequences perform the same operations, when executed, as the one or more portions of the one or more application binaries perform; and
a binary translator comprising a cache management system service executable in a first address space and a runtime code module executable in a second address space of the application binaries, wherein the first address space is separate from the second address space, wherein the cache management system service is configured to manage the translation cache including handling calls to the translation cache, and wherein the runtime code module is configured to manage just-in-time (JIT) translations of the application binaries for which there are no translated code sequences in the translation cache.

14. The system as recited in claim 13 wherein the cache management system service is configured to:
check the translation cache for a corresponding translated code sequence responsive to launching a given application binary of the one or more application binaries, and
provide the corresponding translated code sequence to the runtime code module based on detecting the corresponding translated code sequence in the translation cache.

15. The system as recited in claim 14 wherein checking the translation cache is based on a hash value generated based on the given application binary.

16. The system as recited in claim 15 wherein the hash value is different from a previously-generated hash value if the given application binary has been modified after the corresponding translated code sequence was generated.

17. The system as recited in claim 13 wherein a first translated code sequence of the one or more translated codes sequences in the translation cache is generated when a corresponding application binary is installed in the system.

18. The system as recited in claim 13 wherein a first translated code sequence of the one or more translated codes sequences in the translation cache is generated when a corresponding application binary is initially launched in the system.

19. The system as recited in claim 13 wherein a first translated code sequence of the one or more translated codes sequences in the translation cache is generated as a JIT translation of a corresponding application binary when the corresponding application binary was previously launched in the system.

20. A method, comprising:
- launching a first application binary for execution in a system, wherein the first application binary is written for a first execution environment and one or more processors in the system are configured to execute application binaries in a second execution environment different from the first execution environment;
- determining if a translated code sequence generated by a binary translator is stored in a translation cache in the system, wherein the binary translator comprises a cache management system service executable in a first address space and a runtime code module executable in a second address space of the application binaries, wherein the first address space is a privileged address space, wherein the second address space is a user address space, and wherein determining if the translated code sequence is stored in the translation cache is performed by the cache management system service;
- performing just-in-time translation of the first application binary by the runtime code module based on the translated code sequence not being cached in the translation cache; and
- executing the cached translated code sequence within the runtime code module based on the translated code sequence being cached in the translation cache.

21. The system as recited in claim 1, wherein the first address space is a privileged address space; and
wherein the second address space is a user address space.

22. The system as recited in claim 13, wherein the first address space is a privileged address space; and
wherein the second address space is a user address space.

* * * * *